United States Patent
Hayashi

(10) Patent No.: US 10,763,478 B2
(45) Date of Patent: Sep. 1, 2020

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Kunihiko Hayashi, Anjo (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 62 days.

(21) Appl. No.: 16/241,344

(22) Filed: Jan. 7, 2019

(65) Prior Publication Data
US 2019/0214621 A1  Jul. 11, 2019

(30) Foreign Application Priority Data
Jan. 9, 2018 (JP) ................. 2018-001515

(51) Int. Cl.
*H01M 2/12* (2006.01)
*H01M 10/0525* (2010.01)
(Continued)

(52) U.S. Cl.
CPC ......... *H01M 2/1282* (2013.01); *H01M 2/166* (2013.01); *H01M 2/1653* (2013.01);
(Continued)

(58) Field of Classification Search
CPC ............. H01M 4/622; H01M 10/0525; H01M 10/0587; H01M 2/1653; H01M 2/1686
See application file for complete search history.

(56) References Cited

U.S. PATENT DOCUMENTS 6,589,690 B1  7/2003  Sato et al.
2011/0183173 A1*  7/2011  Muraoka ............... H01M 4/13
429/94

(Continued)

FOREIGN PATENT DOCUMENTS

JP  2014-011070 A  1/2014
JP  2015219971 A  12/2015
(Continued)

*Primary Examiner* — Stewart A Fraser
(74) *Attorney, Agent, or Firm* — Sughrue Mion, PLLC

(57) ABSTRACT

The present invention provides a nonaqueous electrolyte secondary battery having high safety to reliably prevent the progress of successive heat generation when battery temperature rises caused by abnormalities such as internal short-circuits. The nonaqueous electrolyte secondary battery disclosed herein is provided with an electrode body 20 in which a sheet-shaped positive electrode 50 and a sheet-shaped negative electrode 60 oppose each other across separators 70. In the nonaqueous electrolyte secondary battery disclosed herein, the peel strength of a boundary A between each separator 70 and a positive electrode mix layer 54 is greater than the peel strength of a boundary B between the positive electrode mix layer 54 and a positive electrode collector 52. As a result, the progress of successive heat generation derived from an increase in reaction heat can be prevented by causing the positive electrode mix layer 54 to peel off the positive electrode collector 52 accompanying thermal deformation of the separators 70 when battery temperature rises for instance due to an internal short-circuit.

6 Claims, 5 Drawing Sheets

(51) Int. Cl.

| | |
|---|---|
| *H01M 10/0587* | (2010.01) |
| *H01M 2/16* | (2006.01) |
| *H01M 4/131* | (2010.01) |
| *H01M 4/133* | (2010.01) |
| *H01M 4/62* | (2006.01) |
| *H01M 10/0566* | (2010.01) |
| *H01M 4/02* | (2006.01) |

(52) U.S. Cl.
CPC ......... *H01M 2/1686* (2013.01); *H01M 4/131* (2013.01); *H01M 4/133* (2013.01); *H01M 4/622* (2013.01); *H01M 10/0525* (2013.01); *H01M 10/0566* (2013.01); *H01M 10/0587* (2013.01); *H01M 2004/027* (2013.01); *H01M 2004/028* (2013.01); *H01M 2300/0017* (2013.01); *H01M 2300/0085* (2013.01); *H01M 2300/0094* (2013.01)

(56) References Cited

U.S. PATENT DOCUMENTS

| | | |
|---|---|---|
| 2015/0188183 A1 | 7/2015 | Nagai et al. |
| 2017/0179519 A1* | 6/2017 | Okamoto ................ H01M 4/66 |
| 2018/0083309 A1* | 3/2018 | Ho ........................ H01M 4/621 |
| 2019/0214686 A1* | 7/2019 | Hayashi .............. H01M 2/1686 |
| 2019/0267613 A1* | 8/2019 | Kageu Ra; Jun-Ichi .................... H01M 4/525 |

FOREIGN PATENT DOCUMENTS

| | | |
|---|---|---|
| KR | 20000076975 A | 12/2000 |
| WO | 2015173623 A1 | 11/2015 |

\* cited by examiner

NONAQUEOUS ELECTROLYTE SECONDARY BATTERY

BACKGROUND OF THE INVENTION

1. Field of the Invention

The present invention relates to a nonaqueous electrolyte secondary battery. More specifically, the present invention relates to a nonaqueous electrolyte secondary battery in which an electrode body and a nonaqueous electrolyte solution are accommodated within a case. The present application claims priority to Japanese Patent Application No. 2018-1515 filed on Jan. 9, 2018, the entire contents whereof are incorporated into the present specification by reference.

2. Description of the Related Art

Nonaqueous electrolyte secondary batteries (hereafter also simply referred to as "secondary batteries") such as lithium ion secondary batteries and nickel-hydride batteries are lightweight and afford high energy density, and accordingly have come to be preferably used as power sources for vehicle drive and as portable power sources for portable devices. In particular, lithium ion secondary batteries have characteristically high capacity and excellent high-rate charge/discharge properties (rapid charge/discharge properties), and hence are preferably used as high-output power sources for vehicle drive.

Such nonaqueous electrolyte secondary batteries are generally constructed by accommodating an electrode body, being a power generation element, in a case, together with a nonaqueous electrolyte solution. The electrode body is formed by arranging for instance a sheet-shaped positive electrode and a sheet-shaped negative electrode opposing each other, with charging and discharge taking place as a result of movement of charge carriers (for instance lithium ions) between the positive electrode and the negative electrode. In such secondary batteries a separator having formed therein a plurality of fine holes that let charge carriers through is disposed between the positive electrode and the negative electrode. This separator prevents internal short-circuits caused by contact between the positive electrode and the negative electrode.

In such a nonaqueous electrolyte secondary battery internal short-circuits may occur between the positive electrode and the negative electrode, through breakage of the separator, due to various external factors (for instance intrusion of foreign matter into the case, external shocks and piercing by foreign objects such as nails), and internal factors (deposition of dendritic (needle-like) metal particles). In those cases, the temperature of the battery may rise rapidly due to the release of Joule heat at sites where such internal short-circuits occur. Generation of heat derived from such internal short-circuits may result in so-called successive heat generation, i.e. ongoing significant thermal deformation of the separator and further progress in generation of heat derived from an expanding surface area of internal short-circuits, which might eventually lead to thermal runaway.

In recent years, separators have been proposed that are provided with a heat resistance layer (HRL), in order to prevent such successive heat generation derived from thermal deformation of the separator. These heat resistance layers, which contain metal oxide particles (inorganic filler) excellent in heat resistance such as alumina forestall the occurrence of significant thermal deformation in the separator when the temperature rises due to internal short-circuits. As a result, it becomes possible to curtail the progress of successive heat generation derived from an expanding short-circuit surface area. Japanese Patent Application Publication No. 2014-11070 discloses an example of a separator provided with such a heat resistance layer.

SUMMARY OF THE INVENTION

As described above, the use of separators provided with heat resistance layers has been proposed in the technical field of nonaqueous electrolyte secondary batteries with a view to curtailing the progress of successive heat generation derived from thermal deformation of separators. However, the requirements placed on nonaqueous electrolyte secondary batteries in terms of safety have become yet stricter in recent years, and accordingly a demand exists for the development of technologies that allow curtailing more reliably the progress of successive heat generation when battery temperature rises.

In order to develop such a technology, the inventors focused on successive heat generation that progresses due to factors other than the above-described thermal deformation of a separator. Specifically, although internal short-circuits in the secondary battery give rise to Joule heat as described above, large reaction heat may also be released on account of the rapid progress of reactions, triggered by that Joule heat, of various materials inside the battery. Successive heat generation may occur in this case. i.e. the battery temperature may further rise on account of the generated reaction heat, and this rise in temperature may result in further considerable release of reaction heat. Successive heat generation derived from such an increase in reaction heat is difficult to prevent even when using a separator provided with the above heat resistance layer.

It is a main object of the present invention, arrived at in the light of the above considerations, to provide a nonaqueous electrolyte secondary battery boasting high safety and that allows reliably curtailing the progress of successive heat generation when battery temperature rises caused by abnormalities such as internal short-circuits.

The present invention provides a nonaqueous electrolyte secondary battery having the features below, so as to attain the above goal.

The nonaqueous electrolyte secondary battery disclosed herein is provided with: an electrode body in which a sheet-shaped positive electrode and a sheet-shaped negative electrode oppose each other across a separator; a nonaqueous electrolyte solution; and a case that accommodates the electrode body and the nonaqueous electrolyte solution. In this secondary battery, the positive electrode is formed by providing a positive electrode mix layer, containing a positive electrode active material, on the surface of a foil-shaped positive electrode collector, and the separator is provided with at least a resin substrate layer containing an insulating resin.

In the secondary battery disclosed herein, the peel strength of a boundary between the separator and the positive electrode mix layer is set to be greater than the peel strength of a boundary between the positive electrode mix layer and the positive electrode collector.

Generally, when the temperature of the battery rises on account of an abnormality such as an internal short-circuit, a space may form, inside the electrode body, derived from gas generated as a result of decomposition of the nonaqueous electrolyte solution, and the resin substrate layer of the separator may undergo thermal deformation. The separator sandwiched between the positive electrode and the negative electrode is in contact with the positive electrode mix layer, and accordingly the positive electrode mix layer is acted upon by tensile stress accompanying the thermal deformation of the separator (resin substrate layer).

The nonaqueous electrolyte secondary battery disclosed herein, arrived at focusing on that feature, is configured in such a manner that the peel strength of the boundary between the separator and the positive electrode mix layer is greater than the peel strength of the boundary between the positive electrode mix layer and the positive electrode collector. As a result, the positive electrode mix layer can be allowed to peel off the positive electrode collector when tensile stress acts on the positive electrode mix layer due to thermal deformation of the separator (resin substrate layer). Through peeling of the positive electrode mix layer accompanying thermal deformation of the separator, it becomes possible to electrically isolate the positive electrode mix layer and to stop reactions in the battery material. The progress of successive heat generation derived from an increase in reaction heat can be arrested as a result.

The nonaqueous electrolyte secondary battery disclosed herein allows thus electrically isolating the positive electrode mix layer, and thereby arresting the progress of successive heat generation, when battery temperature rises due to an abnormality such as an internal short-circuit. Higher safety can accordingly be secured than in conventional cases.

In a preferred implementation of the nonaqueous electrolyte secondary battery disclosed herein, the peel strength of the boundary between the positive electrode mix layer and the positive electrode collector is 0.3 N/m to 8 N/m.

The peel strength of the positive electrode mix layer and the positive electrode collector in ordinary lithium ion secondary batteries is about 15 N/m. In this configuration, the positive electrode mix layer is readily allowed to peel off the positive electrode collector more readily, through lowering of the peel strength of the positive electrode mix layer and the positive electrode collector down to 8 N/m or less. As a result, it becomes possible to arrest the progress of successive heat generation by suitably isolating the positive electrode mix layer when battery temperature rises caused for instance by an internal short-circuit. If the peel strength is lowered to less than 0.3 N/m, production efficiency may drop on account of peeling of the positive electrode mix layer in the production process of the electrode body. Therefore, the peel strength of the boundary between the positive electrode mix layer and the positive electrode collector is preferably lowered so as to be in the range of 0.3 N/m to 8 N/m.

In a preferred implementation of the nonaqueous electrolyte secondary battery disclosed herein, a heat resistance layer containing an inorganic filler is formed on the surface of the resin substrate layer; and the separator is disposed so that the heat resistance layer is in contact with the positive electrode mix layer.

Preferably, the peel strength of the boundary between the separator and the positive electrode mix layer is increased to reliably peel the positive electrode mix layer off the positive electrode collector accompanying thermal deformation of the separator. Examples of means for increasing the above peel strength include for instance using a separator provided with a heat resistance layer, and bringing the heat resistance layer of the separator into contact with the positive electrode mix layer. As a result, an anchoring effect between heat resistance layer and the positive electrode mix layer is produced, and hence the peel strength of the boundary between the separator (heat resistance layer) and the positive electrode mix layer can be significantly increased.

Thermal deformation of the separator is suppressed through formation of the heat resistance layer in the separator, as described above. To peel the positive electrode mix layer from the positive electrode collector, however, it is not necessary to generate significant thermal deformation, such as that derived from an expanding short-circuit surface area, and there suffices a small thermal deformation such that some tensile stress acts on the positive electrode mix layer. Therefore, this configuration allows bringing about enough thermal deformation such that the positive electrode mix layer is caused to peel off the positive electrode collector, while thermal deformation of the separator is suppressed through formation of the heat resistance layer in the separator.

In a preferred implementation of the nonaqueous electrolyte secondary battery disclosed herein, the positive electrode mix layer contains a binder, and any one of polyvinylidene fluoride, polystyrene and polymethyl acrylate is used as the binder.

The positive electrode mix layer containing such a binder can produce a suitable anchoring effect between the positive electrode mix layer and the heat resistance layer, and accordingly it becomes possible to yet further enhance the peel strength of the boundary between the separator and the positive electrode mix layer.

In a preferred implementation of the nonaqueous electrolyte secondary battery disclosed herein, the resin substrate layer contains a PE layer made of polyethylene, and a PP layer made of polypropylene.

Herein the PE layer made of polyethylene has a so-called shutdown function of curtailing the progress of successive heat generation by plugging holes for permeation of charge carriers, through shrinkage of the sheet when the battery temperature rises rapidly. When a separator is used in which the resin substrate layer is made of the PE layer alone, however, successive heat generation derived from an expanding short-circuit surface area may progress on account of large extent of thermal deformation of the separator. When using a separator containing a PE layer, therefore, it is preferable to provide also a PP layer made of polypropylene. The PP layer is excellent in heat resistance, and accordingly allows suppressing the progress of successive heat generation derived from an expanding short-circuit surface area.

In a preferred implementation of the nonaqueous electrolyte secondary battery disclosed herein, a ratio of the total thickness of the PE layer with respect to the total thickness of the PP layer is in the range of 1.0 to 2.0.

In a case where there is formed a resin substrate layer containing a PE layer and a PP layer, as described above, the ratio of the total thickness of the PE layer with respect to the total thickness of the PP layer is preferably set to be in the range of 1.0 to 2.0. As a result, it becomes possible to strike a suitable balance between the shutdown function and heat resistance, and to suitably curtail the progress of successive heat generation.

DETAILED DESCRIPTION OF THE PREFERRED EMBODIMENTS

Figure 1:
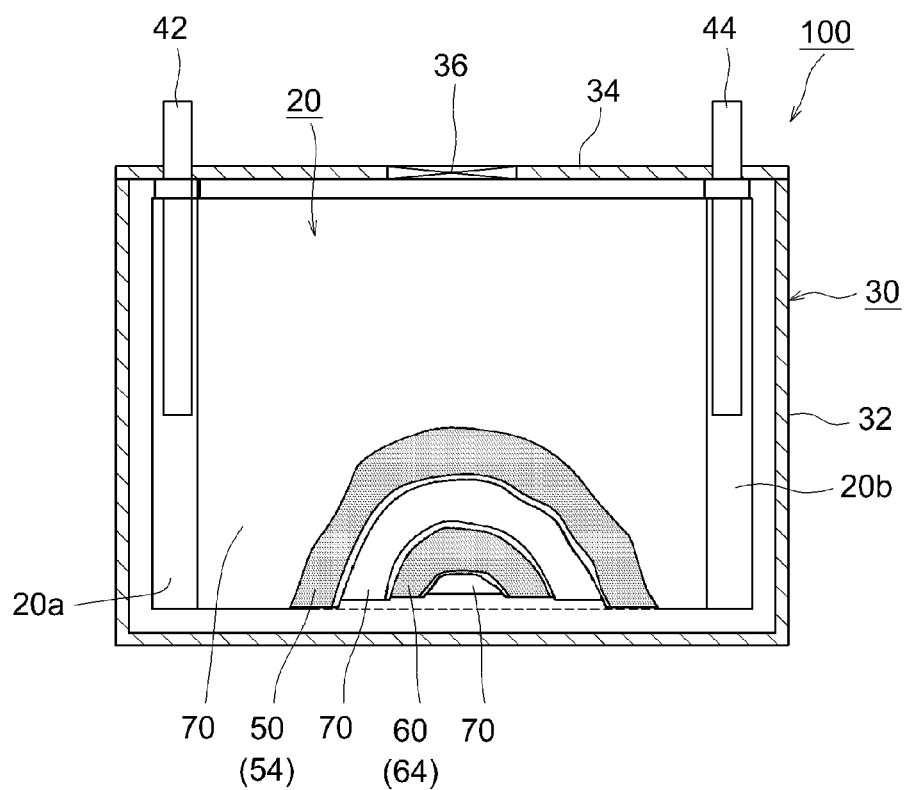
FIG. 1 is a partial cross-sectional diagram illustrating schematically a lithium ion secondary battery according to an embodiment of the present invention.

Embodiments of the present invention will be explained below with reference to accompanying drawings. In the drawings below, members and portions that exert identical effects are denoted with identical reference symbols. The dimensional relationships (length, width, thickness and so forth) in the figures do not reflect actual dimensional relationships. Any features other than the matter specifically set forth in the present specification and that may be necessary for carrying out the present invention (for instance, the detailed structure of electrode terminals) can be regarded as instances of design matter, for a person skilled in the art, based on known technologies in the relevant technical field.

A lithium ion secondary battery will be explained below as an example of the nonaqueous electrolyte secondary battery disclosed herein, but the explanation is not meant to limit the object of the present invention to lithium ion secondary batteries. In the present specification, the term "nonaqueous electrolyte secondary battery" denotes a device that is charged and discharged as a result of the movement of charge carriers via a nonaqueous electrolyte solution, and encompasses not only so-called storage batteries such as lithium ion secondary batteries and nickel-hydride batteries but also electric storage elements such as electrical double layer capacitors.

1. Lithium Ion Secondary Battery According to Present Embodiment

FIG. 1 is a partial cross-sectional diagram illustrating schematically a lithium ion secondary battery according to the present embodiment. As illustrated in FIG. 1, a lithium ion secondary battery 100 according to the present embodiment is configured by accommodating an electrode body 20 and a nonaqueous electrolyte solution (not shown) within a case 30. The various members will be explained below.

(1) Case

The case 30 is made of a lightweight metallic material having good thermal conductivity, such as aluminum. The case 30 is provided with a square case body 32 having an opening formed at the top face, and with a lid body 34 that plugs the opening of the top face of the case body 32.

Electrode terminals (positive electrode terminal 42 and negative electrode terminal 44) connected to an external device are provided in the lid body 34 that constitutes the top face of the case 30. Each electrode terminal is electrically connected to the electrode body 20 inside the case. Besides the electrode terminal, in the top face of the case 30 there are formed as well a safety valve 36 for preventing rises in pressure inside the case 30, and a filling port (not shown) for injecting the nonaqueous electrolyte solution.

(2) Electrode Body

Figure 2:
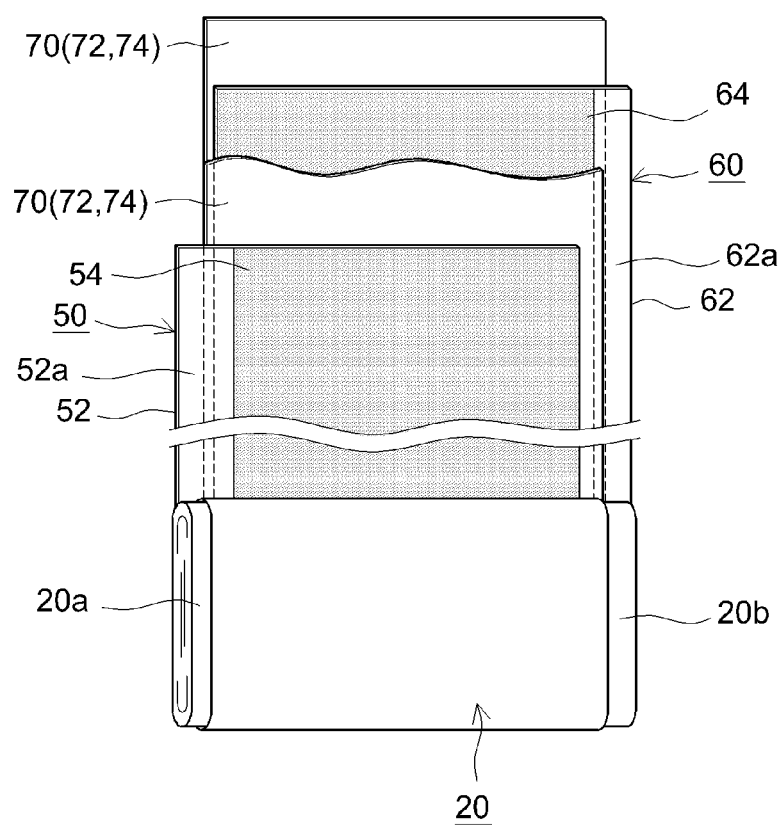
FIG. 2 is a perspective-view diagram illustrating schematically an electrode body of a lithium ion secondary battery according to an embodiment of the present invention.
Figure 3:
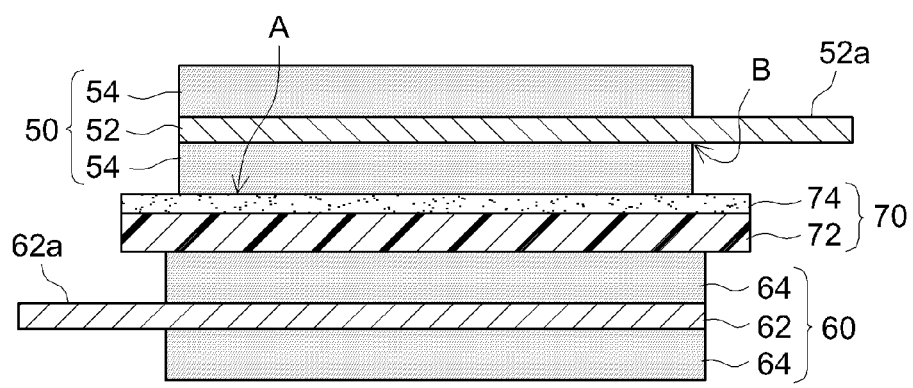
FIG. 3 is a cross-sectional diagram illustrating schematically part of a multilayer structure of an electrode body of a lithium ion secondary battery according to an embodiment of the present invention.
Figure 4:
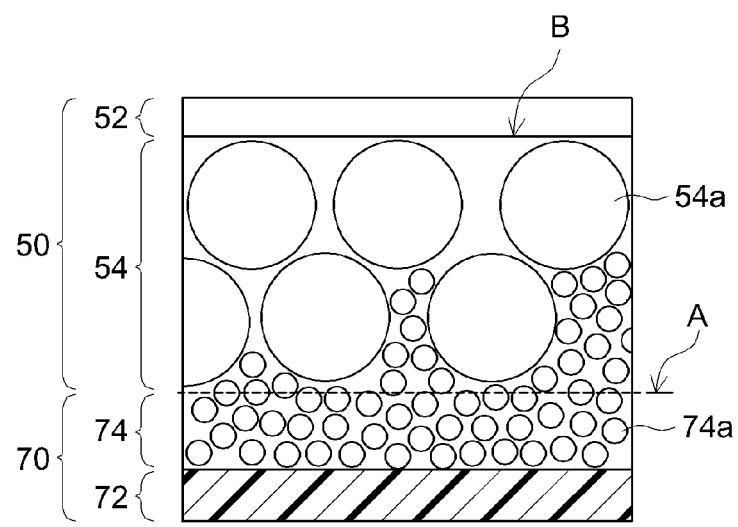
FIG. 4 is an enlarged cross-sectional diagram illustrating schematically the boundary between a positive electrode and a separator in an electrode body of a lithium ion secondary battery according to an embodiment of the present invention.

FIG. 2 is a perspective-view diagram illustrating schematically an electrode body of the lithium ion secondary battery according to the present embodiment. FIG. 3 is a cross-sectional diagram illustrating schematically part of a multilayer structure of the electrode body of the lithium ion secondary battery according to the present embodiment. FIG. 4 is an enlarged cross-sectional diagram illustrating schematically the boundary between a positive electrode and a separator in the electrode body of the lithium ion secondary battery according to the present embodiment.

As illustrated in FIG. 2 and FIG. 3, the electrode body 20 of the present embodiment is constructed by arranging a sheet-shaped positive electrode 50 and a sheet-shaped negative electrode 60 opposing each other across separators 70. More specifically, the sheet-shaped positive electrode 50 and negative electrode 60 are stacked across two separators 70 as illustrated in FIG. 2, to construct the electrode body 20 of the present embodiment. The stack of the positive electrode 50, the negative electrode 60 and the separators 70 are wound, and the obtained wound body is pressed by being squashed at a predetermined pressure. As a result, there is produced a flat wound electrode body such as the one illustrated in FIG. 2. The materials that make up the electrode body 20 will be explained next.

(a) Positive Electrode

As illustrated in FIG. 2, the positive electrode 50 is formed by providing a positive electrode mix layer 54 on the surface (both faces) of a positive electrode collector 52 such as an aluminum foil. A region (positive electrode exposed section 52a) at which the positive electrode mix layer 54 is not provided is formed on one side edge of the positive electrode 50 in the width direction. In the electrode body 20 of the present embodiment, a positive electrode connection section 20a at which the positive electrode exposed section 52a is wound is formed at one side edge, such that the positive electrode terminal 42 is connected to the positive electrode connection section 20a as illustrated in FIG. 1.

The positive electrode mix layer 54 contains a particulate positive electrode active material. For instance, a lithium complex oxide capable of storing and releasing lithium ions is used as the positive electrode active material. As the lithium complex oxide there is preferably used an oxide containing lithium and one or more transition metal elements (lithium-transition metal complex oxide), or a phosphate compound containing lithium and one or more transition metal elements (lithium-transition metal phosphate compound). Concrete examples of lithium-transition metal oxides include for instance lithium-nickel-cobalt-manganese complex oxides (example: $LiNi_{1/3}Co_{1/3}Mn_{1/3}O_2$), lithium-nickel complex oxides (example: $LiNiO_2$), lithium-cobalt complex oxides (example: $LiCoO_2$), lithium-iron complex oxides (example: $LiFeO_2$), lithium-manganese complex oxides (example: $LiMn_2O_4$) and lithium-nickel-manganese complex oxides (example: $LiNi_{0.5}Mn_{1.5}O_4$). Concrete examples of lithium-transition metal phosphate compounds include for instance lithium-iron phosphate compounds (example: $LiFePO_4$).

The positive electrode mix layer 54 may contain various additives other than the positive electrode active material described above. Examples of such additives include conductive materials. As the conductive material there can be suitably used for instance carbon black such as acetylene black (AB), or other carbon materials (for instance graphite).

The positive electrode mix layer 54 may contain a binder that enhances the adhesiveness of the positive electrode mix layer 54 towards the positive electrode collector 52. The binder for the positive electrode mix layer 54 will be explained in detail further on.

(b) Negative Electrode

As illustrated in FIG. 2, the negative electrode 60 is formed by providing a negative electrode mix layer 64 containing a negative electrode active material on the surface (both faces) of a negative electrode collector 62 such as a copper foil. A region (negative electrode exposed section 62a) at which the negative electrode mix layer 64 is not provided is formed on one side edge of the negative electrode 60 in the width direction. In the electrode body 20 of the present embodiment, a negative electrode connection section 20b at which the negative electrode exposed section 62a is wound is formed at one side edge, such that the negative electrode terminal 44 is connected to the negative electrode connection section 20b as illustrated in FIG. 1.

The negative electrode mix layer 64 contains a particulate negative electrode active material. A carbon material capable of storing and releasing lithium ions is used in the negative electrode active material. For instance, graphite, hard carbon or soft carbon is used as the carbon material. A composite material resulting from coating natural graphite particles with amorphous carbon can also be used herein.

The negative electrode mix layer 64 may contain additives other than the negative electrode active material. Examples of such additives include for instance binders and thickeners. Examples of binders for the negative electrode mix layer 64 include for instance styrene butadiene rubber (SBR). Examples of the thickener include for instance carboxymethyl cellulose (CMC).

(c) Separators

Each separator 70 is a sheet-shaped insulating member that is sandwiched between the positive electrode 50 and the negative electrode 60 described above. The separators 70 have formed therein a plurality of small holes through which lithium ion, as charge carriers, can pass. As illustrated in FIG. 3, the separators 70 are provided with a sheet-shaped resin substrate layer 72 containing an insulating resin.

Examples of the insulating resin that is used in the resin substrate layer 72 include for instance polyethylene (PE) and polypropylene (PP). Among the foregoing, a resin sheet (PE layer) made of polyethylene has a shutdown function of plugging holes for permeation of charge carriers, through shrinkage of the sheet when the battery temperature rises rapidly. A resin sheet (PP layer) made of polypropylene is excellent in heat resistance, and accordingly allows suppressing thermal deformation when battery temperature rises, and curtailing the progress of heat generation derived from an expanding short-circuit surface area.

The resin substrate layer 72 may be configured in the form of a single resin sheet, or may be configured in the form of a stack of a plurality of resin sheets. For instance, separators 70 suitably having a shutdown function and heat resistance can be obtained by forming the resin substrate layer 72 through laying of the above PE layer and PP layer. In this case the ratio of the total thickness of the PE layer with respect to the total thickness of the PP layer is preferably set to be in the range of 1.0 to 2.0. As a result, it becomes possible to strike a suitable balance between the shutdown function and heat resistance, and to suitably curtail the progress of successive heat generation.

As illustrated in FIG. 3, the separators 70 of the present embodiment are provided with a heat resistance layer 74. As a result, it becomes possible to prevent the separators 70 from undergoing significant thermal deformation upon rises in the temperature of the battery, and to curtail the progress of successive heat generation derived from an expanding short-circuit surface area.

The heat resistance layer 74 contains an inorganic filler being a metal compound excellent in heat resistance. Examples of the inorganic filler include for instance metal oxides such as alumina ($Al_2O_3$), magnesia (MgO), silica ($SiO_2$) and titania ($TiO_2$); metal nitrides such as aluminum nitride (AlN) and silicon nitride ($Si_3 N_4$); and metal hydroxides such as calcium hydroxide ($Ca(OH)_2$), magnesium hydroxide ($Mg(OH)_2$) and aluminum hydroxide ($Al(OH)_3$). Among the foregoing alumina, magnesia and aluminum hydroxide exhibit not only excellent heat resistance and mechanical strength, but are moreover comparatively inexpensive, and therefore are used particularly preferably herein.

Various additives other than the inorganic filler may be added to the heat resistance layer 74. Examples of the additives include binders. Addition of a binder allows the heat resistance layer 74 and the resin substrate layer 72 to be suitably bonded to each other. An acrylic resin or the like may be used in the binder for the heat resistance layer 74.

(3) Nonaqueous Electrolyte Solution

As described above a nonaqueous electrolyte solution (not shown) is accommodated inside the case 30 together with the electrode body 20. The nonaqueous electrolyte solution, which is filled in between the positive electrode 50 and the negative electrode 60, allows lithium ions, as charge carriers, to move through the nonaqueous electrolyte solution.

The nonaqueous electrolyte solution is prepared by incorporating a supporting salt into an organic solvent (nonaqueous solvent). For instance, ethylene carbonate (EC), dimethyl carbonate (DMC) and ethyl methyl carbonate (EMC) can be used as the organic solvent. These materials in the organic solvent can be used singly or in combinations of two or more types. A lithium salt such as $LiPF_6$ or $LiBF_4$ can be suitably used as the supporting salt. The concentration of the supporting salt is preferably 0.7 M to 1.3 M (for instance 1 M). Besides the supporting salt, the nonaqueous electrolyte solution may also contain additives such as a gas generating agent, a dispersant, a thickener and a film forming agent.

(4) Peel Strength of Separator, Positive Electrode Mix Layer and Positive Electrode Collector In the lithium ion secondary battery 100 according to the present embodiment the electrode body 20 is configured in such a manner that the peel strength of a boundary A between each separator 70 and the positive electrode mix layer 54, illustrated in FIG. 3, is greater than the peel strength of a boundary B between the positive electrode mix layer 54 and the positive electrode collector 52. As a result, it becomes possible to electrically isolate the positive electrode mix layer 54 and thereby arrest the progress of successive heat generation, when the temperature of the battery rises on account of an abnormality such as an internal short-circuit. Higher safety can accordingly be secured than in conventional cases.

Specifically, when the temperature in the interior of the lithium ion secondary battery 100 rises abruptly, a space forms, inside the electrode body 20, derived from gas generated as a result of decomposition of the nonaqueous electrolyte solution, and the resin substrate layer 72 of each separator 70 undergoes thermal deformation. Tensile stress acts on the positive electrode mix layer 54 accompanying this thermal deformation, since the separator 70 is in contact with the positive electrode mix layer 54 of the positive electrode 50.

In the present embodiment, a configuration is adopted wherein the peel strength of the boundary A between each separator 70 and the positive electrode mix layer 54 is greater than the peel strength of the boundary B between the positive electrode mix layer 54 and the positive electrode collector 52, and hence the positive electrode mix layer 54 peels off the positive electrode collector 52 on account of the above-described tensile stress, resulting in electrical isolation. As a result, resistance in the positive electrode 50 increases significantly, and abrupt reactions of the battery material are stopped. This allows arresting the progress of successive heat generation derived from an increase in reaction heat.

In the present embodiment, the peel strengths at the respective boundaries A, B between the separator 70, the positive electrode mix layer 54, and the positive electrode collector 52 are adjusted in such a manner that the positive electrode mix layer 54 is caused to properly peel off the positive electrode collector 52, when the battery temperature rises for instance on account of internal short-circuits. Concrete means for adjusting the peel strength will be explained next.

(a) Peel Strength of Boundary A Between Separator and Positive Electrode Mix Layer As described above, the separators 70 provided with a heat resistance layer 74 are used in the lithium ion secondary battery 100 according to the present embodiment. The peel strength of the boundary A between each separator 70 and the positive electrode mix layer 54 can be enhanced by arranging the separator 70 in such a manner that the heat resistance layer 74 is in contact with the positive electrode mix layer 54.

Specifically, when the heat resistance layer 74 containing the inorganic filler 74a is set to be in contact with the positive electrode mix layer 54, as illustrated in FIG. 4, the inorganic filler 74a in the heat resistance layer 74 intrudes into the positive electrode mix layer 54, and gets in between the particles 54a of the positive electrode active material. As a result, an anchoring effect in which the positive electrode mix layer 54 latches to the heat resistance layer 74 is produced, and the peel strength of the boundary A (see FIG. 3) between the separator 70 and the positive electrode mix layer 54 is thus enhanced.

Preferably, particle size is adjusted in such a manner that the inorganic filler 74a can properly penetrate between the particles 54a of the positive electrode active material, in order to produce an appropriate anchoring effect between the heat resistance layer 74 and the positive electrode mix layer 54. When an appropriate anchoring effect is thus produced between the heat resistance layer 74 and the positive electrode mix layer 54, the peel strength between the separator 70 and the positive electrode mix layer 54 can increase and can be in a range of greater than 8 N/m and lower than 15 N/m.

Preferably, a binder is added to the positive electrode mix layer 54 in order to produce the anchoring effect between the heat resistance layer 74 and the positive electrode mix layer 54 more properly. As a result, it becomes possible to yet further enhance the peel strength of the boundary between the separator and the positive electrode mix layer. Examples of the binder that is added to the positive electrode mix layer 54 include for instance polyvinvlidene fluoride (PVdF), polystyrene (PS) and polymethyl acrylate (PMA).

To produce the electrode body 20, as described above, a wound body of the positive electrode 50, the negative electrode 60 and the separators 70 are pressed through squashing at a predetermined pressure. By increasing the pressure at this time the inorganic filler 74a can be caused to properly intrude into the positive electrode mix layer 54, and produce thereby a suitable anchoring effect. If the pressing pressure is excessively high, the likelihood of breakage of the electrode body 20 in the production process increases, and production efficiency may drop.

(b) Peel Strength of Boundary B Between Positive Electrode Mix Layer and Positive Electrode Collector In the lithium ion secondary battery 100 according to the present embodiment the peel strength of the boundary B between the positive electrode mix layer 54 and the positive electrode collector 52 brought down to 8 N/m or less. The positive electrode mix layer 54 can be peeled easily as a result. However, if the peel strength of the boundary B between the positive electrode mix layer 54 and the positive electrode collector 52 is set too low, production efficiency may drop on account of peeling of the positive electrode mix layer 54 during the production of the electrode body; accordingly, the peel strength of the boundary B is preferably adjusted to be 0.3 N/m or greater.

In the present embodiment the various conditions below are adjusted in order to bring the peel strength of the boundary B between the positive electrode mix layer 54 and the positive electrode collector 52 down to the range of 0.3 N/m to 8 N/m (preferably 0.3 N/m to 4 N/m).

In the present embodiment the production conditions of a positive electrode paste being a precursor of the positive electrode mix layer 54 are adjusted first, to thereby lower the peel strength at the boundary B between the positive electrode mix layer 54 and the positive electrode collector 52.

To produce the positive electrode paste, specifically, firm churning is carried out through addition of a predetermined solvent to a powder material such as a positive electrode active material, in small amounts spread over several additions, with kneading of the whole. The adhesive strength of the positive electrode paste decreases when prolonging the firm churning duration, as a result, it becomes possible to lower the peel strength of the boundary B between the positive electrode mix layer 54 and the positive electrode collector 52. The peel strength of the boundary B between the positive electrode mix layer 54 and the positive electrode collector 52 can be reduced also in a case where the viscosity of the produced positive electrode paste is lowered.

The peel strength of the boundary B between the positive electrode mix layer 54 and the positive electrode collector 52 is also influenced by the conditions during drying of the positive electrode paste that is applied to the positive electrode collector 52. Specifically, the peel strength of the boundary B between the positive electrode mix layer 54 and the positive electrode collector 52 can be lowered through quick drying of the positive electrode paste by resorting to some means, such as arranging the positive electrode collector 52, having the positive electrode paste adhered thereto, in a high-temperature environment, or adjusting airflow during drying.

As described above, in the present embodiment a binder (for instance PVdF) that swells upon absorption of a non-aqueous electrolyte solution is used in the binder for the positive electrode mix layer 54. Such a binder has the characteristic of exerting sufficient adhesiveness in the production process of the electrode body 20, but exhibiting a drop in adhesiveness, due to swelling, after filling of the electrolyte solution. Accordingly, the binder is added to the positive electrode mix layer 54, to thereby prevent drops in production efficiency through detachment of the positive electrode mix layer 54 during production of the electrode body 20, while allowing suitably lowering the peel strength of the boundary B between the positive electrode mix layer 54 and the positive electrode collector 52.

Further, the binder described above has the property of degrading in a high-temperature environment, giving rise to a further drop in adhesiveness. As a result, peeling of the positive electrode mix layer 54 can be more easily carried out.

In a case where the above-described resin material is used as the binder for the positive electrode mix layer 54, the addition amount of the binder with respect to the total solids of the positive electrode mix layer 54 is preferably 1 wt % to 5 wt % (for instance 2 wt %). When the addition amount of the binder is excessively small, production efficiency may drop, due to peeling of the positive electrode mix layer 54 during production of the electrode body 20. If the addition amount of the binder is excessive, on the other hand, the peel strength of the boundary B between the positive electrode mix layer 54 and the positive electrode collector 52 increases, and peeling of the positive electrode mix layer 54 on account of thermal deformation of the separators 70 becomes difficult.

2. Other Embodiments

A nonaqueous electrolyte secondary battery according to an embodiment of the present invention has been explained above, but the nonaqueous electrolyte secondary battery disclosed herein is not limited to the embodiment described above, and may accommodate various alterations and modifications.

In the embodiment described above, for instance, there are used the separators 70 provided with the heat resistance layer 74, and the heat resistance layer 74 and the positive electrode mix layer 54 are set to be in contact with each other, to thereby increase the peel strength between each separator 70 and the positive electrode mix layer 54 by virtue of an anchoring effect.

However, the means for increasing the peel strength between the separator and the positive electrode mix layer is not limited to the above-described means, and some other means may be resorted to. For instance, a means may be resorted to that involves using a separator provided with an adhesive layer containing a binder as a main component, the separator being disposed in such a manner that the adhesive layer is in contact with the positive electrode mix layer. The peel strength between the separator and the positive electrode mix layer can be thus enhanced also when using a separator that has no heat resistance layer.

In the embodiment described above there is increased the peel strength of the boundary A between each separator 70 and the positive electrode mix layer 54, and there is reduced the peel strength of the boundary B between the positive electrode mix layer 54 and the positive electrode collector 52. So long as the peel strength as either of the boundaries A and B can be adjusted properly, however, the effect of the present invention can also be brought about properly even without adjustment of the peel strength of the other boundary. For instance, the peel strength of the boundary B between the positive electrode mix layer 54 and the positive electrode collector 52 can be sufficiently reduced by adjusting properly for instance the production conditions of the positive electrode paste. As a result, the progress of successive heat generation can be curtailed through peeling of the positive electrode mix layer 54 accompanying thermal deformation of the separator, even if there is formed no layer for enhancing the peel strength of for instance the heat resistance layer or the adhesive layer, at the boundary A between each separator 70 and the positive electrode mix layer 54.

Test Examples

Test examples pertaining to the present invention will be explained next, but the explanation of the test examples is not meant to limit the present invention in any way.

1. Samples

In the present test example there were produced 18 lithium ion secondary batteries (Samples 1 to 18) with differing peel strengths of the mix layer and the collector.

Specifically, firstly a positive electrode active material ($LiNi_{1/3}Co_{1/3}Mn_{1/3}O_2$), a conductive material (acetylene black: AB) and a binder (PVdF) were mixed at a ratio by weight of 90:8:2. A positive electrode paste was produced through firm churning of the obtained powder material while under addition of a dispersion medium (N-methylpyrrolidone: NMP). The positive electrode paste was applied onto both faces of a positive electrode collector (aluminum foil), followed by drying and rolling, to thereby produce a sheet-shaped positive electrode.

In the present test example, the peel strength of the boundary between the positive electrode mix layer and the positive electrode collector was adjusted as given in Table 1, by modifying the firm churning conditions of the positive electrode paste and the drying conditions of the positive electrode paste.

Next, a powder material for a negative electrode was prepared by mixing a negative electrode active material, a thickener (CMC) and a binder (SBR) at a ratio by weight of 98:1:1. In the present test example a composite carbon material of natural graphite particles coated with amorphous carbon was used as the negative electrode active material.

A negative electrode paste was then produced through firm churning of the prepared powder material while under addition of a dispersion medium (NMP). The negative electrode paste was applied onto both faces of a negative electrode collector (copper foil), followed by drying and rolling, to thereby produce a sheet-shaped negative electrode.

A separator provided with a heat resistance layer was produced in the present test example. Firstly, an inorganic filler (alumina particles) and a binder (acrylic resin) were mixed to a 96:4 mass ratio, and the whole was kneaded while under addition of deionized water, to thereby produce a paste for heat resistance layer formation. Next, the paste for heat resistance layer formation was applied onto one face of a resin substrate layer having an average thickness of 20 μm, with drying, to produce as a result a separator having a heat resistance layer formed on one face of the resin substrate layer.

As set out in Table 1, in the present test example there were used separators having different structures of resin substrate layer, in each of the samples. Specifically, in Samples 1 to 14 there was used a resin substrate layer having a three-layer structure in which a PP layer was formed on both faces of a PE layer, with the total thickness of the PE layer with respect to the total thickness of the PP layer being set to differ for each sample, as given in Table 1. In Samples 15 and 17 there was used as resin substrate layer consisting only of a PP layer, and in Samples 16 and 18 there was used a resin substrate layer consisting only of a PE layer.

Stacks were produced with a respective separator sandwiched between the positive electrode and the negative electrode. Each resulting stack was wound and was thereafter pressed, to thereby produce a flat wound electrode body (battery capacity: 5 Ah). In Samples 1 to 10 and 15 to 18 the separators were disposed in such a manner that the heat resistance layer was in contact with the positive electrode mix layer, as given in Table 1. In Samples 11 to 14 the separators were disposed in such a manner that the heat resistance layer was in contact with the negative electrode mix layer.

The produced wound electrode body and electrode terminals were connected, after which the whole was accommodated in a square case made of aluminum, together with an electrolyte solution, and the case was sealed, to thereby construct a respective lithium ion secondary battery (Samples 1 to 18) for an evaluation test. The electrolyte solution used in the present test example was a nonaqueous electrolyte solution obtained by dissolving a supporting salt ($LiPF_6$), to a concentration of about 1 M, in a mixed solvent being a mixture of EC, EMC and DMC at a 1:1:1 volume ratio.

2. Evaluation Test
(1) Measurement of Peel Strength

The lithium ion secondary battery of each sample was dismantled, and the electrode body was removed from the case and was cut out to strips having a dimension of 10 mm×150 mm. The tensile strength upon 90° peeling of the positive electrode mix layer from the positive electrode collector was measured using a peel strength meter (by A&D Company, Limited, model name: Tensilon). The measurement results are given in Table 1.

(2) Internal Short-Circuit Test

In the present test example an internal short-circuit test was performed next on the lithium ion secondary batteries of Samples 1 to 18 described above.

Specifically, the battery of each sample was placed in a 25° C. temperature environment and was subjected to initial charging, by being charged at constant current of 0.2 C, up to 4.9 V, followed by constant-volume charging until the current value was 0.02 C.

After initial charging, the case of the each battery was opened, and an L-shaped nickel piece having a long-side length of 1000 μm was set as a contaminant inside the case, which was sealed again. The nickel piece was disposed inside the case in such a manner that the long side of the L-shape was substantially perpendicular to the flat surface of the wound electrode body.

Each battery was then charged to full charge, and the site at which the nickel piece had been embedded was pressed from above the case at a pressure of 3 kN; as a result, the nickel piece pierced the electrode body giving thereby rise to an internal short-circuit. Thereafter, a thermocouple was attached to the exterior the case of each sample, the battery temperature was continuously measured until the rise in temperature reached a plateau, and the maximum temperature rise (Δ° C.) after the internal short-circuit test was measured. The measurement results are illustrated in Table 1 and FIG. 5.

TABLE 1

| | Structure of resin material (PE layer/PP layer) | Peel strength of positive electrode mix layer and peel strength (N/m) | Layer opposed to heat resistance layer | Maximum temperature rise after internal short-circuit test (° C.) |
|---|---|---|---|---|
| Sample 1 | 1.3 | 0.3 | Positive electrode mix layer | 2.7 |
| Sample 2 | 1.3 | 4 | Positive electrode mix layer | 4.1 |
| Sample 3 | 1.3 | 8 | Positive electrode mix layer | 7.0 |
| Sample 4 | 0.8 | 4 | Positive electrode mix layer | 5.3 |
| Sample 5 | 1.0 | 4 | Positive electrode mix layer | 3.6 |
| Sample 6 | 1.3 | 4 | Positive electrode mix layer | 4.1 |
| Sample 7 | 2.0 | 4 | Positive electrode mix layer | 3.4 |
| Sample 8 | 2.2 | 4 | Positive electrode mix layer | 5.7 |
| Sample 9 | 1.0 | 0.2 | Positive electrode mix layer | — |
| Sample 10 | 1.3 | 15 | Positive electrode mix layer | 14.0 |
| Sample 11 | 1.3 | 0.3 | Negative electrode mix layer | 14.8 |
| Sample 12 | 1.3 | 4 | Negative electrode mix layer | 14.9 |
| Sample 13 | 1.3 | 8 | Negative electrode mix layer | 11.7 |
| Sample 14 | 1.3 | 15 | Negative electrode mix layer | 13.3 |
| Sample 15 | PP alone | 4 | Positive electrode mix layer | 9.0 |
| Sample 16 | PE alone | 4 | Positive electrode mix layer | 8.1 |
| Sample 17 | PP alone | 15 | Positive electrode mix layer | 36.5 |
| Sample 18 | PE alone | 15 | Positive electrode mix layer | 31.9 |

Figure 5:
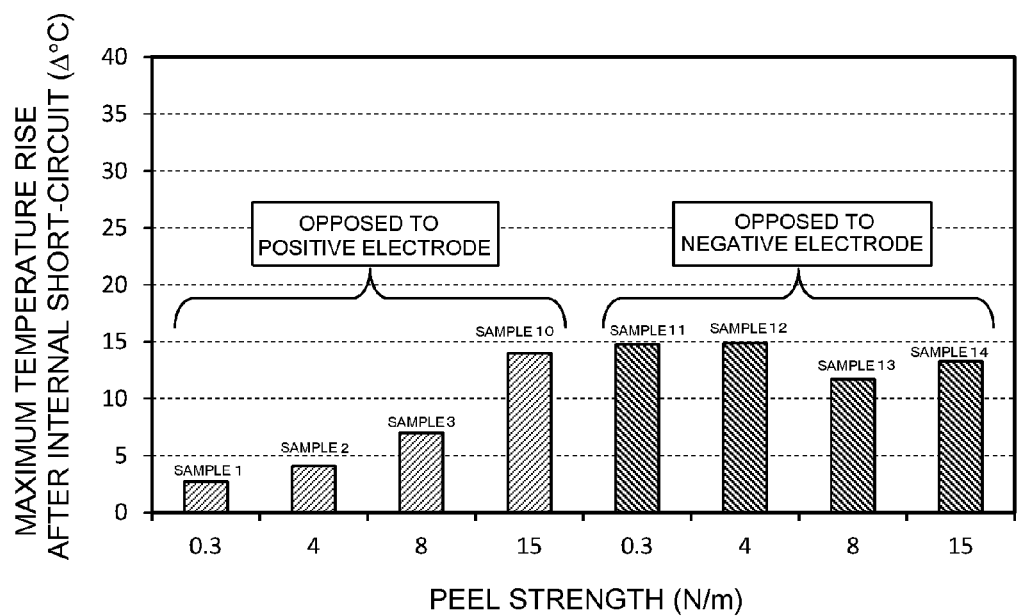
FIG. 5 is a graph illustrating the relationship between positive electrode peel strength (N/m) and maximum temperature rise ($\Delta°$ C.) after an internal short-circuit test, measured in a test example.

A comparison between Samples 1 to 3 and 10 reveals, in the light of Table 1 and FIG. 5, that a maximum temperature rise after an internal short-circuit could be curtailed to 10° C. or less in Samples 1 to 3, where the peel strength of the boundary between the positive electrode mix layer and the positive electrode collector lay in the range of 0.3 N/m to 8 N/m. A visual check of the dismantled batteries of Samples 1 to 3 showed that the positive electrode mix layer was adhered to the thermally deformed separator, while the positive electrode mix layer had peeled off the positive electrode collector.

In Sample 9, where the peel strength of the boundary between the positive electrode mix layer and the positive electrode collector was adjusted to 0.2 N/m, the positive electrode mix layer peeled during production process of the electrode body, and it was difficult to construct a lithium ion secondary battery for testing.

These results revealed that when the peel strength between the separator and the positive electrode mix layer is increased through contact between the heat resistance layer and the positive electrode mix layer, the positive electrode mix layer can be properly isolated, and the progress of successive heat generation can thereby arrested during a rise in the temperature of the battery caused by an internal short-circuit, by bringing the peel strength of the positive electrode mix layer and the positive electrode collector down to a range of 0.3 N/m to 8 N/m.

The results in Samples 1 to 3 and 10 of the present test example suggest that in the present test example where the heat resistance layer and the positive electrode mix layer are set to be in contact with each other, an anchoring effect is produced at the boundary between the heat resistance layer and the positive electrode mix layer, and peel strength increased and was in the range of greater than 8 N/m and lower than 15 N/m. By contrast, no suppression of heat generation such as that found in Samples 1 to 3 could be observed in Samples 11 to 14, where the negative electrode mix layer and the heat resistance layer were set to be in contact with each other, even when the peel strength was brought down to 0.3 N/m (Sample 11). This suggests that no anchoring effect is produced, even by setting the negative electrode mix layer and the heat resistance layer to be in contact with each other, and that the negative electrode mix layer cannot be peeled suitably off the negative electrode collector.

Such being the case, by bringing the heat resistance layer of the separator into contact with the positive electrode mix layer to produce an anchoring effect, the peel strength of the boundary A between the separator and the positive electrode mix layer can be increased and can be in the range of greater than 8 N/m and lower than 15 N/m. It was found that the progress of successive heat generation upon rises in the temperature of the battery due to internal short-circuits can be arrested by adjusting the peel strength of the boundary B between the positive electrode mix layer and the positive electrode collector to be smaller than the peel strength of the boundary A.

A comparison between Samples 4 to 8, 15 and 16 revealed that the rise in temperature when an internal short-circuit occurs is also influenced by the ratio of the PE layer and the PP layer that make up the resin substrate layer. A comparison between these samples revealed that the maximum temperature rise after an internal short-circuit was better suppressed in Samples 4 to 8, where resin substrate layers of multilayer structure were used that contained a PE layer and a PP layer, than it was the case in Samples 15 and 16. In particular, it was found that the maximum temperature rise after an internal short-circuit could be curtailed to 5° C. or less in Samples 5 to 7, where the thickness ratio of the PE layer and the PP layer was adjusted to be in the range of 1.0 to 2.0.

Concrete examples of the present invention have been explained in detail above, but these are merely exemplary in nature, and are not meant to limit the scope of the claims in any way. The features set forth in the claims can accommodate various modifications and alterations of the concrete examples illustrated above.

What is claimed is:

1. A nonaqueous electrolyte secondary battery, comprising:
   an electrode body in which a sheet-shaped positive electrode and a sheet-shaped negative electrode oppose each other across a separator;
   a nonaqueous electrolyte solution; and
   a case that accommodates the electrode body and the nonaqueous electrolyte solution,
   wherein the positive electrode is formed by providing a positive electrode mix layer, containing a positive electrode active material, on a surface of a foil-shaped positive electrode collector;
   the separator is provided with at least a resin substrate layer containing an insulating resin; and
   the peel strength of a boundary between the separator and the positive electrode mix layer is greater than the peel strength of a boundary between the positive electrode mix layer and the positive electrode collector.

2. The nonaqueous electrolyte secondary battery according to claim 1, wherein the peel strength of the boundary between the positive electrode mix layer and the positive electrode collector is 0.3 N/m to 8 N/m.

3. The nonaqueous electrolyte secondary battery according to claim 1, wherein a heat resistance layer containing an inorganic filler is formed on the surface of the resin substrate layer; and the separator is disposed so that the heat resistance layer is in contact with the positive electrode mix layer.

4. The nonaqueous electrolyte secondary battery according to claim 1, wherein any one of polyvinylidene fluoride, polystyrene and polymethyl acrylate is used in a binder contained in the positive electrode mix layer.

5. The nonaqueous electrolyte secondary battery according to claim 1, wherein the resin substrate layer contains a PE layer made of polyethylene, and a PP layer made of polypropylene.

6. The nonaqueous electrolyte secondary battery according to claim 5, wherein a ratio of the total thickness of the PE layer with respect to the total thickness of the PP layer is in the range of 1.0 to 2.0.

* * * * *